Patented Feb. 28, 1933

1,899,243

UNITED STATES PATENT OFFICE

EDWIN B. NEWTON, OF AKRON, OHIO, ASSIGNOR TO THE B. F. GOODRICH COMPANY, OF NEW YORK, N. Y., A CORPORATION OF NEW YORK

METHOD OF DISPERSING RUBBER IN WATER

No Drawing. Application filed December 3, 1929. Serial No. 411,391.

This invention relates to the art of rubber manufacture, and particularly to the preparation of aqueous dispersions of rubber and like substances.

Heretofore aqueous dispersions of rubber have been made by working a hydrophyllic colloid into rubber and adding water until the aqueous phase—including the colloid—attains such proportions that the rubber can no longer retain it as dispersed particles. Further working of the mass then causes the rubber to break into minute globules and causes the aqueous medium to become the continuous phase. The rubber is then said to be dispersed, and the dispersion may generally be diluted to any desired concentration.

This invention consists in dispersing rubber in water by a new process which is readily carried out, even by relatively unskilled labor, as it does not necessitate the careful and painstaking supervision and control heretofore found essential, and which permits the production of dispersions of a low alkalinity, containing a minimum proportion of hydrophyllic colloids. This new process consists in incorporating into the rubber or rubber-like substance which is to be dispersed a small proportion of a colloid which is not soluble in water but which is capable of promoting the dispersion of water in the rubber. Thereupon water is worked into the rubber containing the said non-aqueous colloid, until the proportion is sufficient for the inversion of the phases. The inversion is effected by adding a suitable peptizing agent, and if desired, a protective colloid.

The non-aqueous colloid which is employed in the first stage of the process should be soluble in the rubber, capable of promoting the dispersion of water in the rubber, even when only small proportions are used, and should not have any undesirable effect either on the rubber itself or on the dispersion. These conditions are admirably fulfilled by certain water-insoluble soaps, such as the soaps of magnesium, calcium, barium, aluminum, zinc, lead, etc., with oleic acid, stearic acid, etc.

This invention in its broad scope includes water-insoluble soaps in general, although the soaps of the alkaline earth metals are preferred.

The proportion of the water-insoluble soap mixed into the rubber need not be large, from 0.2% to 5% being quite sufficient. Larger proportions should be employed with caution, since they may make the final step of inversion difficult or impossible. The choice of the particular soap which is employed is governed largely by the use to which the dispersion is to be put and by the characteristic properties of the soap. For example, if a vulcanizable rubber composition is to be dispersed, a certain proportion of a zinc soap may be incorporated therewith, the zinc soap then serving both as the primary dispersing agent in the method of this invention, and as an activator to assist the organic vulcanization accelerator ordinarily used.

The second step of the process, namely, mixing water into the rubber containing the water-insoluble soap is ordinarily carried out in the same vessel in which the rubber and the soap were mixed, an internal mixer containing two blades rotating at different speeds in a steam-jacketed housing being found quite suitable. If it is preferred to mix the rubber and the soap in some other manner, say by mastication on a roll mill, the batch should be transferred to a mixer capable of containing liquids before the water is added. In some cases it may be found desirable to add a small quantity of ammonia or gum-arabic to the water, but this is not always necessary.

After a sufficient quantity of water is worked into the rubber the phases are inverted by the addition of a hydrophyllic colloid. A nitrogenous colloid such as casein or gelatine may be employed, but a water-soluble soap is preferable. The quantity of colloid employed should be sufficient to stabilize the dispersion adequately, unless distinct peptizing agents are employed, in which case the quantity of each is gauged to fulfill its specific mission. Thus, sufficient sodium oleate may be employed to peptize and disperse the rubber and an added quantity of casein may be incorporated to stabilize the dispersion.

*Example 1.*—As a specific example of one manner of carrying out this invention 100 parts by weight of crude rubber are thoroughly masticated until plastic and are then placed in an internal mixer and mixed with 1 part of zinc oleate. 20 parts of water are slowly added to the rubber, until the whole quantity has been absorbed and the mass is homogeneous. 6 parts of potassium oleate in the form of a thick paste are then mixed in, whereupon the rubber breaks and the inversion of the phases takes place. The dispersed rubber may then be freely diluted, the water of dilution preferably being made slightly alkaline with ammonia.

The dispersion is quite stable, of uniform and small particle size and does not contain any nitrogenous colloids which would diminish the elasticity of the rubber. It may be mixed freely with natural rubber latex or with alkaline dispersions of rubber, pigments, oils, etc. It is readily coagulated, like natural latex, by the addition of a suitable quantity of acid or of a soluble salt of a polyvalent metal.

*Example 2.*—As an example of the dispersion of rubber-like substances a tough, heat-plastic balata-like rubber isomer such as that prepared by the reaction of rubber with sulphonic acids, and described by Harry L. Fisher in United States Patent No. 1,605,180, dated November 2, 1926, is selected. 100 parts of the said rubber isomer are prewarmed, for example in an oven, and then masticated in a steam-jacketed internal mixer until smooth and homogeneous, 0.5 parts of calcium oleate being incorporated during the mastication. 2 parts gum arabic are dissolved in 30 parts water and the solution is slowly worked into the batch, the mixer being kept covered to prevent evaporation of the water. After all the gum arabic solution is absorbed and the mass is homogeneous the inversion is effected by mixing in a paste of 3 parts of potassium oleate, immediately followed by 3 parts of casein, likewise dissolved to a thick paste by swelling it in hot water and adding strong ammonia.

The dispersed rubber isomer is quite stable and of a uniformly small particle size.

The method of this invention may likewise be employed to effect the dispersion of rubber or like materials containing pigments, fillers, softeners, vulcanizing agents, accelerators, etc. It is to be understood, therefore, that the term "rubber" is employed in the appended claims in a generic sense to include caoutchouc, both natural and synthetic, guttapercha, balata, reclaimed rubber, rubber isomers, and like products, whether or not mixed with each other or with other compounding ingredients.

I claim:

1. The method of dispersing an acqueous medium in rubber as a preliminary to the inversion of the phases and the dispersion of the rubber in an acqueous medium, which method comprises incorporating a water-insoluble soap in the rubber, and working the acqueous medium into the rubber-soap mixture.

2. The method of dispersing rubber which comprises incorporating in the rubber successively, in the order named, a water-insoluble soap, water, and a hydrophyllic colloid.

3. The method of dispersing rubber which comprises incorporating in the rubber a water-insoluble soap, working water into the rubber, and inverting the phases of a peptizing agent.

4. The method of dispersing rubber which comprises incorporating into rubber a water-insoluble soap, working water into the rubber, and inverting the phases with a hydrophyllic peptizing colloid.

5. The method of dispersing rubber which comprises incorporating into rubber a water-insoluble soap, working water into the rubber, and inverting the phases with a water-soluble soap.

6. The method of dispersing rubber which comprises incorporating into rubber a soap of an alkaline earth metal, working water into the rubber, and inverting the phases with a peptizing agent.

7. The method of dispersing rubber which comprises incorporating into rubber a small proportion of a soap of an alkaline earth metal, working water into the rubber, and inverting the phases with a water-soluble soap.

8. The method of dispersing rubber which comprises incorporating into rubber a small proportion of calcium oleate, working water into the rubber, and inverting the phases with a water-soluble soap.

9. The method of dispersing rubber which comprises incorporating into rubber a small proportion of a water-insoluble soap, working into the rubber an acqueous solution of a hydrophyllic colloid, and inverting the phases with a peptizing agent.

In witness whereof I have hereunto set my hand this 15th day of November, 1929.

EDWIN B. NEWTON.

CERTIFICATE OF CORRECTION.

Patent No. 1,899,243.   February 28, 1933.

EDWIN B. NEWTON.

It is hereby certified that error appears in the printed specification of the above numbered patent requiring correction as follows: Page 2, line 83, claim 3, for "of" read "with"; and that the said Letters Patent should be read with this correction therein that the same may conform to the record of the case in the Patent Office.

Signed and sealed this 22nd day of August, A. D. 1933.

M. J. Moore.
Acting Commissioner of Patents.

(Seal)